United States Patent Office 3,464,790
Patented Sept. 2, 1969

3,464,790
PROCESS FOR MAKING SYNTHETIC SINTERED MAGNESIA
Richard Schrader, Wilfried Grünwoldt, Hubert Hennek, and Götz Kneschke, Freiberg, and Helmut Reinhardt, Saxony, Aken (Elbe), Germany, assignors to Veb Magnesit-Werke Aken, Aken (Elbe), Germany
No Drawing. Filed Oct. 21, 1965, Ser. No. 500,188
Claims priority, application Germany, June 11, 1965, V 28,659
Int. Cl. C01f 5/02
U.S. Cl. 23—201
8 Claims

ABSTRACT OF THE DISCLOSURE

Process for producing sinter-active magnesium oxide, in which magnesium oxide obtained from solutions of magnesium salts in a comparatively sinter-inactive form is activated by various treatments, all of which bring about a rearrangement of the crystal lattic in the MgO crystal. Such treatments are hydration, ultrasonic treatment and neutron bombardment, also a combination of such treatments. The resulting MgO is then readily sinterable at temperatures below 1800° C. yielding MgO of a density in excess of 3.0 g./cm.$^3$.

This invention relates to a process for making sintered magnesia from magnesium oxide which is generally obtainable from solutions or salts containing magnesium sulfate or magnesium chloride. More particularly, the invention relates to a novel process comprising activation of the magnesium oxide by various means so as to render it sinterable, at technically convenient temperature, into a high-density material.

Several known methods relate to the processing of magnesium hydroxide or magnesium carbonate into sintered magnesia. According to these methods, the hydroxide or carbonate can be converted, at temperatures in excess of 800° C., into magnesium oxide which is sinterable at high temperatures, the conversion being carried out either in a single step at elevated temperatures, or with an additional dehydrating step included. According to some known methods, the magnesium oxide is also pre-compacted before sintering. It is also known to use various mineralizers such as $Fe_2O_3$, $SiO_2$, $Al_2O_3$, $TiO_2$, $FeO \cdot TiO_2$, CaO to promote crystallization at the firing temperatures and thereby to increase the degree and the rate of sintering.

Magnesium oxide can also be obtained from dolomite, salt by-products, sea water, or magnesium sulfate or chloride-containing solutions, by the thermal pyrolytic decomposition of such magnesium salt solutions. This latter type of magnesium oxide is resistant to sintering to such an extent that even addition of known sintering promoters does not allow the accomplishment of a sufficiently dense sintered product at technically acceptable temperatures. Technically acceptable or convenient are regarded those temperatures below 1800° C.; and the smallest density value for sintered magnesia, which can be still considered acceptable, is 3.0 g./cm.$^3$ It is an object of the present invention to provide a method whereby magnesium oxide obtained from the pyrolytic decomposition of magnesium chloride or magnesium sulfate can be sintered at technically convenient temperatures into a high-density and pure sintered product.

The process of the invention can be accomplished by subjecting magnesium oxide to an intraparticular treatment to produce active magnesium oxide. The term intraparticular treatment, as used in the present specification and claims, denotes one or a combination of three basic methods, all of which render magnesium oxide active, or readily sinterable, by acting upon the interior of an inactive magnesium-oxide particle by bringing about a structural reconditioning, rearrangement of crystal lattice, or otherwise. The three basic methods of intraparticular treatment are hydration, breakup of the particles, and high-energy bombardment between 0.5 and 2 mev. at about $1.5 \times 10^{12}$ neutrons/cm. sec. The resulting magnesium oxide is readily sinterable at temperatures below 1800° C. to sintered magnesia of a dense periclase structure and having a density in excess of 3.0 g./cm.$^3$ In accordance with that variety of intraparticular treatment which involves hydration, inactive magnesium oxide, such as can be obtained by known methods from the pyrolytic decomposition of magnesium chloride or sulfate, by slurrying the magnesium oxide in water, whereupon hydrolysis occurs. After hydrolysis is completed, active magnesium oxide can be produced by calcination of the hydrate, preferably at about 800 to 1000° C. The active character of the magnesium oxide produced via hydration can be further enhanced by a number of measures. According to one such measure, hydrolysis can be carried out at elevated temperatures. Further improvements can be accomplished by adding a surfactant such as wetting agents, detergents, flotation agents, at concentrations less than 1% mass, preferably less than 0.1% mass, to the water used in the hydrolysis, whereby the surface tension of the water is reduced and hydration is accelerated. Since most contaminants that are likely to be present in the hydrated magnesium oxide, and which would have an inhibiting effect upon the sintering characteristics of the magnesium oxide, such as alkalies, chlorides, and sulfates, are soluble in water, they can be separated from the hydrate by filtration.

It has been discovered that ultrasonic treatment of the magnesium oxide, in the aqueous suspension, remarkably increases the activity of the magnesium oxide compared to that result which can be accomplished by hydration alone. Furthermore, hydration of magnesium oxide is a slow process and can require time periods of over 10 hours for completion. In accordance with a preferred embodiment of the hydration variety of the inventive intraparticular treatment, hydration is accelerated by simultaneous ultrasonic treatment.

The second principal type of intraparticular treatment involves the physical breakup of the inactive magnesium-oxide particles. Magnesium oxide obtained by pyrolytic decomposition of magnesium salts is a porous material, the crystal lattice of which is deformed, such as by some form of grinding, so as to turn into an active variety. A great variety of grinding equipment can be used, however, centrifugal mills and jet mills are preferred. In these devices especially fine particle sizes can be obtained, in that a gas or steam jet is used to accelerate the particles to be ground, and particle-size reduction is accomplished by impact between the particles themselves, and impact between the particles and the walls of the device. Alkali, chloride, or sulfate contaminations can be easily removed, e.g., by conducting the particle-size reduction at elevated temperatures, such as in a high-temperature centrifugal mill at over 500° C.

Prior to the step of grinding in order to accomplish breaking up of the particles, a grinding adjuvant may be added to the particles to be ground. Grinding adjuvants are known per se, but they are of special advantage in the process of the invention. As examples of grinding adjuvants, we may mention oleic acid, stearic acid, and palmitic acid, as well as salts and esters of these acids.

Breakup of the particles can be combined, for instance, with a hydration step. After the inactive magnesium-oxide particles have been reduced in size, water can be added to accomplish a faster hydration of the reduced-size particles. After hydration, the active magnesium-oxide can be recovered by calcination of the filtered solids. The entire process can be carried out continuously, if desired, even with an additional ultrasonic treatment step included.

In the third principal type of intraparticular treatment, high-energy bombardment between 0.5 and 2 mev. (preferably 1 mev.) at a neutron current of about $1.5 \times 10^{12}$ neutrons/cm.$^2$ sec. is used in the range of gamma rays and neutron bombardment. This type of intraparticular treatment can be combined with any one or more of the other types of intraparticular treatments. For instance, hydration conducted in a ball mill can be followed by a high-energy treatment.

In the sintering of magnesium oxide the magnesium-oxide particles agglomerate and form a polycrystalline mass composed mainly of periclase. As already stated, the addition of not more than 3% mass of mineralizers promotes periclase formation during sintering, whereby a dense, sintered body can be obtained at somewhat lower temperatures than without the mineralizer additive. If pure sintered magnesia is desired, it is known to use relatively easily sinterable natural or synthetic magnesium hydroxide, oxide, or carbonate, or the like, in concentrations of not over 3% mass instead of the above-mentioned mineralizers. The magnesium carbonate, because of its better crystallization characteristics, collects the less sinter-active magnesium-oxide particles surrounding it to form the periclase. The benefits obtainable by these additions can be used in conjunction with the separate or simultaneous intraparticular treatment methods of the invention.

The following examples illustrate the best mode contemplated for carrying out the invention, but the invention is not to be construed as limited to all details of the examples.

EXAMPLE 1

Magnesium oxide obtained from the pyrolytic decomposition of magnesium chloride was charged into a continuous-type centrifugal mill. Steel balls having a diameter of 8 to 12 mm. were used, and the diameter of the centrifugal path was 4 to 10 mm. at 3 to 8 g. acceleration. Grinding for 10, preferably 15 minutes produced an active magnesium oxide which was briquetted, and then fired at 1700° C. for 2 hours, resulting in a product having a density between 3.15 and 3.25 g./cm.$^3$.

A control sample was prepared as described above, except for the intraparticular grinding treatment, resulting in a sintered product having a density of only 2.6 g./cm.$^3$.

EXAMPLE 2

Magnesium oxide obtained from the pyrolytic decomposition of magnesium salts was subjected to intraparticular treatment in the centrifugal mill of Example 1 but now at 500° C. under a protective atmosphere to prevent temperature corrosion of the metal parts. After briquetting and sintering as in Example 1, a product having a density of 0.05 to 0.1 g./cm.$^3$, higher than the density of Example 1, was obtained.

EXAMPLE 3

Inactive magnesium oxide obtained from the pyrolytic decomposition of magnesium chloride was mixed with 3% mass of $\alpha$-$Fe_2O_3$ as mineralizer, and subjected to intraparticular treatment in the centrifugal mill of Example 1. After briquetting and firing at 1700° C. for 2 hours, the density of the product was 3.3 g./cm.$^3$.

A control sample was prepared, similar to the just described procedure, except that the mineralizer was added after the intraparticular treatment, but before briquetting. The density of this control was 3.22 g./cm.$^3$.

Another control was prepared in an identical manner, except that no intraparticular treatment and no mineralizer were used. The density of the resulting control was 2.8 to 2.87 g./cm.$^3$.

EXAMPLE 4

Inactive magnesium oxide was subjected to high-energy bombardment of 1 mev. at $1.5 \times 10^{12}$ neutrons/cm.$^2$ sec. After a 2-hour firing at 1700° C. a product density of 3.05 g./cm.$^3$ was obtained.

EXAMPLE 5

Inactive magnesium oxide obtained from the thermal decomposition of magnesium chloride hydrate was mixed with 20% per mass, based on the mixture, of natural magnesium hydroxide having a particle size less than 0.1 mm. The mixture was subjected to intraparticular treatment in the centrifugal mill of Example 1. After firing at 1700° C. for 2 hours, a product having a density of 3.1 to 3.2 g./cm.$^3$ was obtained.

A control was prepared as before, except without intraparticular treatment. The density of the fired control was 3 g./cm.$^3$.

Another control, prepared as described, but without added magnesium hydroxide and without intraparticular treatment, had a density of 2.6 g./cm.$^3$.

EXAMPLE 6

Magnesium chloride hydrate ($MgCl_2 \cdot 1\frac{1}{2}H_2O$) was pyrolytically decomposed to magnesium oxide having a magnesium-oxide content of 98.5%. This material was slurried in water until hydration was completed. The magnesium hydroxide was filtered off, calcined at 800° C., briquetted, and fired at 1700° C. for 2 hours. The resulting product density was 3.35 g./cm.$^3$.

A control was made with the same pyrolytically decomposed inactive magnesium oxide, being briquetted and fired at 1700° C. for 2 hours, without the first described intervening intraparticular hydration treatment. The density of the control sample was 2.6 g./cm.$^3$.

EXAMPLE 7

The same inactive magnesium oxide as used in Example 6 was ground for 8 hours under water in a ball mill. After filtration, the recovered solids were calcined at 800° C., briquetted, and fired at 1700° C. for 2 hours. The resulting product density was 3.4 g./cm.$^3$. Another firing run of the same intraparticularly treated material, for 2 hours at 1400° C., resulted in a product density of 3.14 g./cm.$^3$.

EXAMPLES 8 THROUGH 10

Pyrolytic inactive magnesium oxide was mixed with 1% mass $TiO_2$ and slurried in water until hydrolysis was completed. The filtered-off solids were calcined at 1000° C., briquetted and fired for 2 hours at 1500° C., 1600° C., and 1700° C., respectively. The product densities in each case were over 3.4 g./cm.$^3$.

EXAMPLE 11

Pyrolytically decomposed inactive magnesium oxide was slurried in water and subjected to ultrasonic waves of 800 kc. frequency for a period of 5 minutes. The filtered solids were calcined, briquetted and fired for 2 hours at 1700° C., with a resulting product density of 3.1 to 3.2 g./cm.$^3$.

A control made as above but without the combined intraparticular treatment had a product density of 2.9 g./cm.$^3$.

We claim:
1. A process for producing sinter-active magnesium oxide from sinter-inactive magnesium oxide which comprises subjecting magnesium oxide to intraparticular treatment including hydration, reducing the size of the particles by milling, and neutron bombardment, whereby a rearrangement of the crystal lattice is effected, separat- ing the solids, and calcining the separated solids to magnesium oxide.

2. The process as defined in claim 1, wherein the hydrating step is combined with treatment with waves in the ultrasonic frequency range.

3. The process as defined in claim 1, wherein said intraparticular treatment comprises subjecting magnesium oxide to neutron bombardment between 0.5 and 2 mev. at a neutron current of about $1.5 \times 10^{12}$ cm.$^2$ sec.

4. The process as defined in claim 1, wherein a surfactant is added during the step hydration.

5. The process as defined in claim 1, wherein prior to the step of reducing the size of said particles a grinding adjuvant is added to said particles.

6. The process as defined in claim 5, wherein said grinding adjuvant is a fatty acid from the group consisting of oleic acid, stearic acid, palmitic acid, and their salts or esters.

7. The process as defined in claim 1, wherein an effective amount of a compound selected from the group consisting of a mineralizer and a magnesium hydroxide is added to said magnesium oxide.

8. The process as defined in claim 7, wherein said compound is added to said magnesium oxide prior to said intraparticular treatment.

References Cited

UNITED STATES PATENTS

| 1,273,110 | 7/1918 | Mitchell | 23—201 |
|---|---|---|---|
| 2,335,374 | 11/1943 | Woodward | 23—201 |
| 2,640,759 | 6/1953 | Hughley | 23—201 |
| 2,668,749 | 2/1954 | McHan | 23—66 |
| 2,940,831 | 6/1960 | Nossardi et al. | 23—201 |
| 3,104,216 | 9/1963 | Ruskin. | |
| 3,127,242 | 3/1964 | Cohn et al. | 23—201 |
| 3,133,792 | 5/1964 | Jones | 23—201 |
| 3,249,453 | 5/1966 | Schnoring et al. | |
| 3,340,079 | 9/1967 | Bryant | 106—105 |

EARL C. THOMAS, Primary Examiner

G. T. OZAKI, Assistant Examiner

U.S. Cl. X.R.

23—293; 204—157.1